(12) United States Patent
Thasari et al.

(10) Patent No.: US 12,113,657 B2
(45) Date of Patent: Oct. 8, 2024

(54) PUCCH FORMAT 1 SIGNAL PROCESSING WITH REDUCED COMPLEXITY

(71) Applicant: Rakuten Symphony, Inc., Tokyo (JP)

(72) Inventors: Sri Venkata Gautham Thasari, Bangalore (IN); Aghil Vinayak Puzhakkal, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/040,814

(22) PCT Filed: Nov. 28, 2022

(86) PCT No.: PCT/US2022/051106
§ 371 (c)(1),
(2) Date: Feb. 7, 2023

(87) PCT Pub. No.: WO2024/118047
PCT Pub. Date: Jun. 6, 2024

(65) Prior Publication Data
US 2024/0259247 A1     Aug. 1, 2024

(51) Int. Cl.
*H04W 72/23*     (2023.01)
*H04L 5/00*     (2006.01)
*H04L 27/26*     (2006.01)

(52) U.S. Cl.
CPC ...... *H04L 27/26526* (2021.01); *H04L 5/0048* (2013.01); *H04W 72/23* (2023.01)

(58) Field of Classification Search
CPC . H04W 72/23; H04W 72/21; H04W 72/0446; H04W 72/20; H04W 72/0453; H04W 72/04; H04W 72/1268; H04W 24/10; H04L 5/0053; H04L 5/0055; H04L 5/001; H04L 1/1861; H04L 5/0048; H04L 1/1812; H04L 5/0094; H04L 1/1854; H03M 13/09; H03M 13/13; H03M 13/6525;
(Continued)

(56) References Cited

U.S. PATENT DOCUMENTS

| | | | | |
|---|---|---|---|---|
| 11,197,279 | B1 * | 12/2021 | Jia | .......................... H04W 72/21 |
| 11,825,418 | B2 * | 11/2023 | Miao | ................... H04W 52/146 |
| 2008/0075158 | A1 | 3/2008 | Li | |

(Continued)

*Primary Examiner* — Eva Y Puente
(74) *Attorney, Agent, or Firm* — HAUPTMAN HAM, LLP

(57) ABSTRACT

A network device includes receiver circuitry and a processor. The receiver circuitry is configured to receive a signal from a plurality of terminal devices, over a physical uplink control channel (PUCCH) format 1 (FMT1). The processor is coupled to the receiver circuitry, and is configured to perform processing on the received signal to obtain decoded data corresponding to the plurality of terminal devices, and utilize the decoded data for handling further communications with the plurality of terminal devices. In the processing, the processor is configured to obtain a demodulated signal sequence from the received signal. The processor is further configured to perform, on the demodulated signal sequence, a transform from a frequency domain into a time domain to obtain a time domain sequence. The processor is further configured to extract, from the time domain sequence, one or more data blocks corresponding to each terminal device among the plurality of terminal devices.

20 Claims, 6 Drawing Sheets

(58) Field of Classification Search
CPC ........... H03M 13/136; H03M 13/6362; H03M 13/6306; H03M 13/23; H03M 13/353
USPC ........................................................ 375/260
See application file for complete search history.

(56) References Cited

U.S. PATENT DOCUMENTS

| | | |
|---|---|---|
| 2013/0128857 A1 | 5/2013 | Nakao |
| 2015/0245344 A1 | 8/2015 | You et al. |
| 2019/0098576 A1 | 3/2019 | Papasakellariou et al. |
| 2021/0377992 A1* | 12/2021 | Elshafie ............ H04W 72/0453 |
| 2021/0390004 A1* | 12/2021 | Kundu .................... G06F 9/545 |

* cited by examiner

PUCCH FORMAT 1 SIGNAL PROCESSING WITH REDUCED COMPLEXITY

RELATED APPLICATIONS

The present application is a National Phase of International Application No. PCT/US2022/051106, filed Nov. 28, 2022.

TECHNICAL FIELD

The present disclosure is related to physical uplink control channel (PUCCH) Format 1 (FMT1) signal processing with reduced complexity.

BACKGROUND

In a wireless communications system, user equipment (UE) communicates with a network node (e.g., a base station, or the like) to receive data on one or more downlink channels. The UE sends signaling to the network node on one or more uplink channels. For example, the uplink signaling from the UE to the network node includes a hybrid automatic repeat request (HARQ) acknowledgment (ACK), or negative acknowledgement (NACK), for the downlink data. Other signaling includes reports, scheduling requests, or the like. The uplink signaling is transmitted, for example, over a physical uplink control channel (PUCCH). There are various PUCCH formats, e.g., Format 1 (FMT1), Format 2, Format 3, or the like. Each PUCCH format is configured for a specific type of signaling and/or purposes.

SUMMARY

In other approaches, processing of PUCCH FMT1 signals on the receiving side, e.g., at a network node, is performed in the frequency domain. Each UE requires the network node to employ a number of correlations for PUCCH FMT1 signal processing. When multiple UEs are multiplexed on the same communications resource, these correlations increase, e.g., linearly, with the number of UEs. As a result, when the number of multiplexed UEs increases, processing of PUCCH FMT1 signals at the receiving side may become highly complex and may consume an excessive amount of time, computing power/resources, or the like. The complexity and/or time/resource consumption of PUCCH FMT1 signal processing contribute(s) to reduce the network node's UE capacity.

In some embodiments, processing of PUCCH FMT1 signals at a network device is performed in the time domain. As a result, in one or more embodiments, it is possible to perform one or more operations collectively for multiple UEs, while processing PUCCH FMT1 signals. In at least one embodiment, the complexity and/or time/resource consumption of PUCCH FMT1 signal processing is/are reduced which, in turn, help in increasing the network device's UE capacity.

In some embodiments, a network device comprises receiver circuitry and a processor. The receiver circuitry is configured to receive a signal from a plurality of terminal devices, over a physical uplink control channel (PUCCH) format 1 (FMT1). The processor is coupled to the receiver circuitry. The processor is configured to perform processing on the received signal to obtain decoded data corresponding to the plurality of terminal devices, and utilize the decoded data for handling further communications with the plurality of terminal devices. In the processing, the processor is configured to obtain a demodulated signal sequence from the received signal. The processor is further configured to perform, on the demodulated signal sequence, a transform from a frequency domain into a time domain to obtain a time domain sequence. The processor is further configured to extract, from the time domain sequence, one or more data blocks corresponding to each terminal device among the plurality of terminal devices.

In some embodiments, a non-transitory, tangible computer readable storage medium storing a computer program. The program, when executed by a processor, causes the processor to perform an Inverse Discrete Fourier Transform (IDFT) transform to obtain a time domain sequence from each received signal among a plurality of received signals. The plurality of signals is correspondingly received at a plurality of antennas from a plurality of terminal devices over a physical uplink control channel (PUCCH) format 1 (FMT1). For each terminal device among the plurality of terminal devices, the processor is further caused to extract one or more data blocks corresponding to the terminal device from the time domain sequence, obtain decoded data of the terminal device based on the one or more data blocks, and utilize the decoded data for handling further communications with the terminal device.

In some embodiments, a method performed at least in part by a processor comprises obtaining, using a base sequence, a demodulated signal sequence from a signal received over a physical uplink control channel (PUCCH) format 1 (FMT1). The method further comprises performing an Inverse Discrete Fourier Transform (IDFT) on the demodulated signal sequence to obtain a time domain sequence. The method further comprises extracting, from the time domain sequence and based on an initial cyclic shift that is unique for a terminal device, one or more data blocks and one or more demodulation reference signal (DMRS) blocks corresponding to the terminal device. The method further comprises removing orthogonal cover code (OCC) from the one or more data blocks and the one or more DMRS blocks, to correspondingly obtain OCC-removed data and OCC-removed DMRS. The method further comprises obtaining decoded data based on the OCC-removed data and OCC-removed DMRS of the terminal device, and utilizing the decoded data for handling further communications with the terminal device.

BRIEF DESCRIPTION OF THE DRAWINGS

Aspects of the present disclosure are best understood from the following detailed description when read with the accompanying figures In accordance with the standard practice in the industry, various features are not drawn to scale. In fact, the dimensions of the various features be arbitrarily increased or reduced for clarity of discussion.

DETAILED DESCRIPTION

Figure 1B:
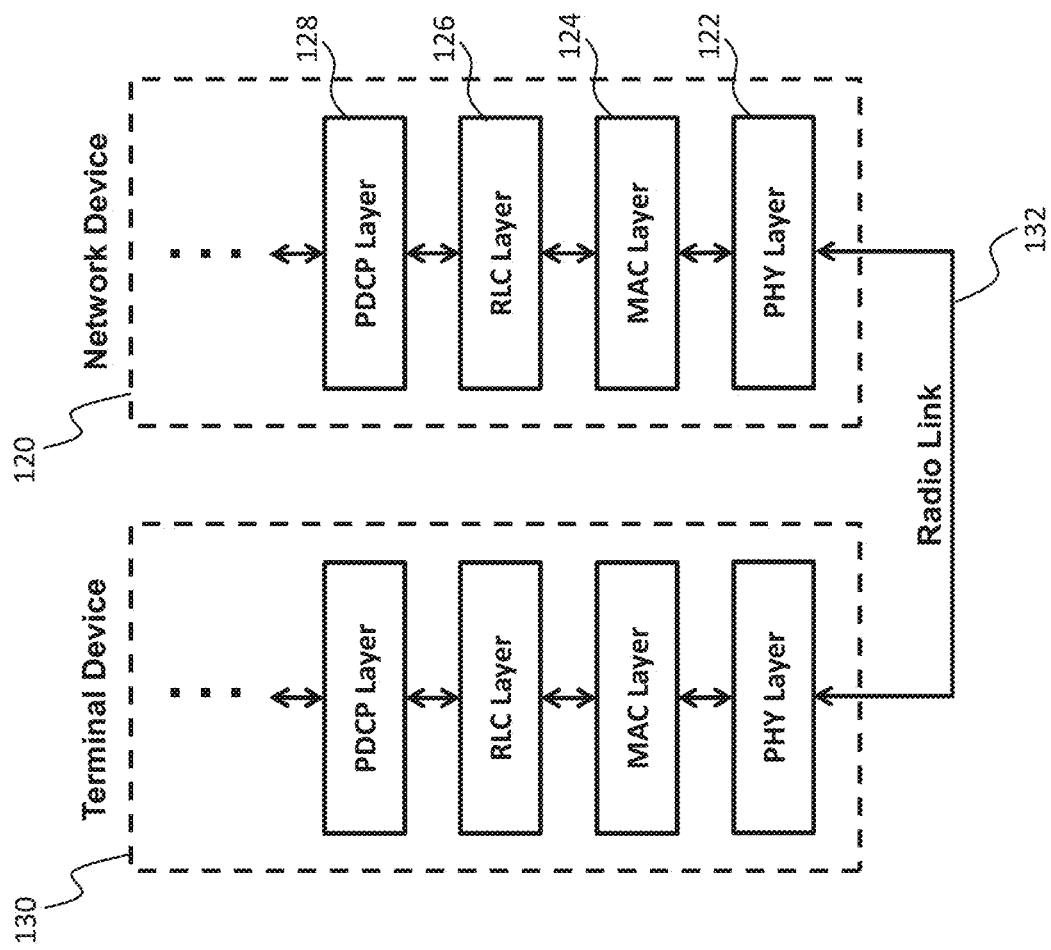
FIG. 1B is a schematic diagram of an example of a protocol stack for communications between a network device and a terminal device, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, be usable herein for ease of description to describe one element or feature's relationship to another element(s) or feature(s) as illustrated in the figures The spatially relative terms are intended to encompass different orientations of the device in use or operation in addition to the orientation depicted in the figures The apparatus be otherwise oriented (rotated 90 degrees or at other orientations) and the spatially relative descriptors FIG. 1A is a schematic diagram of an example communications system 100, in accordance with some embodiments.

Figure 1A:
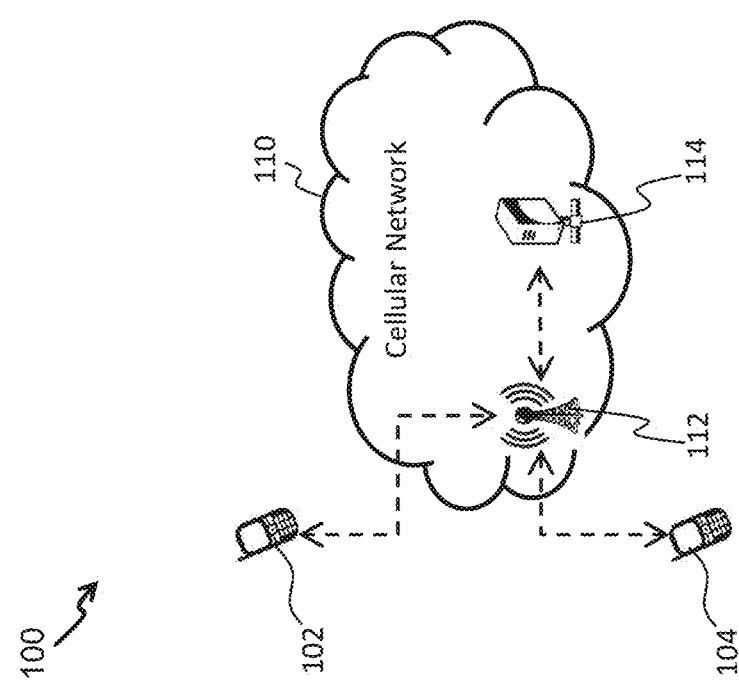
FIG. 1A is a schematic diagram of an example communications system, in accordance with some embodiments.

In the example configuration of the communications system 100 in FIG. 1A, terminal devices 102, 104 are coupled to a cellular network 110 to receive communication services. In an example, the cellular network 110 comprises a plurality of cells (not shown) in which cellular services are provided through corresponding network devices, such as base stations, access nodes (or access points), or the like. A representative base station 112 is illustrated in FIG. 1A. The base stations and/or access nodes constitute a radio access network, and are coupled to a core network of the cellular network 110. A representative core network component 114 of the core network is illustrated in FIG. 1A. In some embodiments, a terminal device accesses the communications system 100 to obtain a service of an external network (for example, a data network) or to communicate with another terminal device. In the communications system 100, the radio access network, including base stations and/or access nodes, is configured to permit access by the terminal device to the communications system 100, whereas the core network, including core network components, is configured to manage the terminal device and provide a gateway for communicating with the data network.

Examples of the cellular network 110 include, but are not limited to, a long term evolution (LTE) network, a fifth generation (5G) network, a sixth generation (6G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, a Wi-Fi (or WIFI) network, a WIMAX network, or the like. Examples of services provided over cellular communication, herein referred to as cellular communication services, include, but are not limited to, voice calls, data, emails, messages such as SMS and MMS, applications, and control signals.

In some embodiments, a terminal device is configured to provide a user with voice and/or data connectivity. A terminal device is configured to communicate with the core network through the radio access network of the communications system 100, and to exchange voice and/or data with the radio access network. Examples of terminal devices include, but are not limited to, user equipment (UE), device-to-device (D2D) communication equipment, vehicle-to-everything (V2X) communication equipment, machine-to-machine/machine type communication (M2M/MTC) communication equipment, internet of things (IOT) communication equipment, cell phones, tablets, media players, gaming consoles, personal data assistants (PDAs), laptops, other electronic devices configured to transmit and/or receive cellular communication to/from network devices of the cellular network 110, or the like. An example hardware configuration of a terminal device is described with respect to FIG. 4.

In some embodiments, a network device is any device that is configured to communicate with a terminal device over an air interface or radio link which employs PUCCH FMT1 signals as described herein. In some embodiments, a network device is configured to enable a terminal device to access the radio access network. Examples of network devices include, but are not limited to, next generation NodeB (gNB) in a 5G communications system, evolved NodeB (eNB), radio access network controllers (RNC), NodeB (NB), network device controllers (BSC), base transceiver stations or base stations (BTS), home network devices such as home evolved NodeB and/or home NodeB, baseband unit (BBU) communication equipment, transmission reception points (TRP), transmitting points (TP), or the like. In an example configuration, a network devices include one or more cellular antennas, one or more sets of transmitter/receivers (transceivers), digital signal processors, control electronics, a Global Positioning System (GPS) receiver for timing (e.g., for CDMA2000/IS-95 or GSM systems), or the like. In some embodiments, a network device comprises one or more hardware components on/by which software corresponding to various algorithms and/or operations described here is executed. An example hardware configuration of a network device is described with respect to FIG. 4.

Examples of core network components of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The core network components of the core network are coupled with each other and with the network devices by one or more public and/or proprietary networks. An example hardware configuration of a core network component of the core network is described with respect to FIG. 4, but without cellular transceiving circuitry and associated antennas. Other hardware configurations for a terminal device, a network device, or a core network component are within the scopes of various embodiments.

FIG. 1B is a schematic diagram of an example of a protocol stack for communications between a network device 120 and a terminal device 130, in accordance with some embodiments. For example, the network device 120 corresponds to one or more network devices in the communications system 100, and the terminal device 130 corresponds to one or more of the terminal devices 102, 104.

In the example configuration in FIG. 1B, communications between the network device 120 and the terminal device 130 comply with a protocol stack including, for the network device 120, a physical layer (PHY layer) 122, a media access control layer (MAC layer) 124, a radio link control layer (RLC layer) 126, a packet data convergence protocol layer (PDCP layer) 128, or the like. The terminal device 130 similarly includes a corresponding protocol stack including PHY layer, a MAC layer, an RLC layer, a PDCP layer, or the like. For simplicity, the protocol layers in the terminal device 130 are not numbered. In the protocol stack, the MAC layer is a higher layer than the PHY layer, the RLC layer is a higher layer than the MAC layer, and so on. With respect to the PHY layer, higher layers in the protocol stack include the MAC layer, the RLC layer, the PDCP layer, and any other layer(s) above the PDCP layer.

In a control plane, control-relevant information is exchanged between the network device 120 and the terminal device 130. For example, the establishment and/or management of communication sessions between the network device 120 and terminal device 130 occur(s) at a top layer on the control plane referred to as non-access stratum (NAS) (not shown). A radio resource control (RRC) layer is between the NAS and the PDCP layer, and is configured to set various parameters for the communication sessions.

In a user plane, data are exchanged between the network device 120 and the terminal device 130. A top layer on the user plane includes an application layer (not shown), followed by a lower Internet Protocol (IP) layer (not shown). A service data adaptation protocol (SDAP) layer (not shown) is between the IP layer and the PDCP layer, and is configured, e.g., for quality of service (QOS) management.

Communications between the network device 120 and the terminal device 130 include downlink communications from the network device 120 to the terminal device 130, and uplink communications from the terminal device 130 to the network device 120. In an example downlink communication, upon obtaining data from an upper (or higher) layer, the PDCP layer 128 transmits the data to the RLC layer 126 and the MAC layer 124, the MAC layer 124 generates a transport block, and then wireless communications are performed through the physical layer 122, via a radio link (or air interface) 132 between antennas of the network device 120 and the terminal device 130. Data flow between the RLC layer, MAC layer, and PHY layer through channels. For example, logical channels are between the RLC layer 126 and the MAC layer 124 and are configured to define the type of data to be transferred. Transport channels are between the MAC layer 124 and the PHY layer 122, and are configured to define how data are carried to the PHY layer 122 and characteristics of the data. The PHY layers of the network device 120 and the terminal device 130 communicate with each other through physical channels with characteristics such as timing, access protocols, data rates, modulation, beamforming, or the like. At the terminal device 130, data received from the network device 120 are transferred from the PHY layer sequentially through the MAC layer, the RLC layer, the PDCP layer to one or more higher layers. Uplink communications occur in the reversed order to that described with respect to downlink communications.

Examples of uplink physical channels include physical uplink shared channel (PUSCH), physical random access channel (PRACH), and physical uplink control channel (PUCCH). PUSCH is configured to carry RRC signaling messages, uplink control information (UCI), and application data. PRACH is configured to carry random access preambles for initiation of random access procedure. PUCCH has various formats. For example, PUCCH Format 1 (FMT1) is configured to carry UCI pertaining to scheduling requests and hybrid automatic repeat requests (hybrid ARQ or HARQ), with UE multiplexing in the same physical resource block (PRB). PUCCH Format 2 is configured to carry UCI pertaining to channel quality indicators (CQI) and HARQ, without UE multiplexing in the same PRB. PUCCH Format 3 is configured to carry UCI pertaining to scheduling requests and HARQ, without UE multiplexing in the same PRB. Other PUCCH formats are available.

Some embodiments are applicable to PUCCH FMT1, as described in the $3^{rd}$ Generation Partnership Project (3GPP), at the following sections:

Technical Specification (TS) 38.211, at
    6.3.2.1 General,
    6.3.2.2 Sequence and cyclic shift hopping,
    6.3.2.2.1 Group and sequence hopping,
    6.3.2.3.2 Cyclic shift hopping,
    6.3.2.4 PUCCH FMT1,
    6.3.2.4.1 Sequence modulation (includes cyclic-shift and OCC),
    6.3.2.4.2 Mapping to physical resources,
    6.4.1.3.1 Demodulation reference signal for FMT1,
    6.4.1.3.1.1 Sequence generation, and
    6.4.1.3.1.2 Mapping to physical resources, and TS 38.213, at
    9.2.2 PUCCH formats for UCI transmission.

Figure 2A:
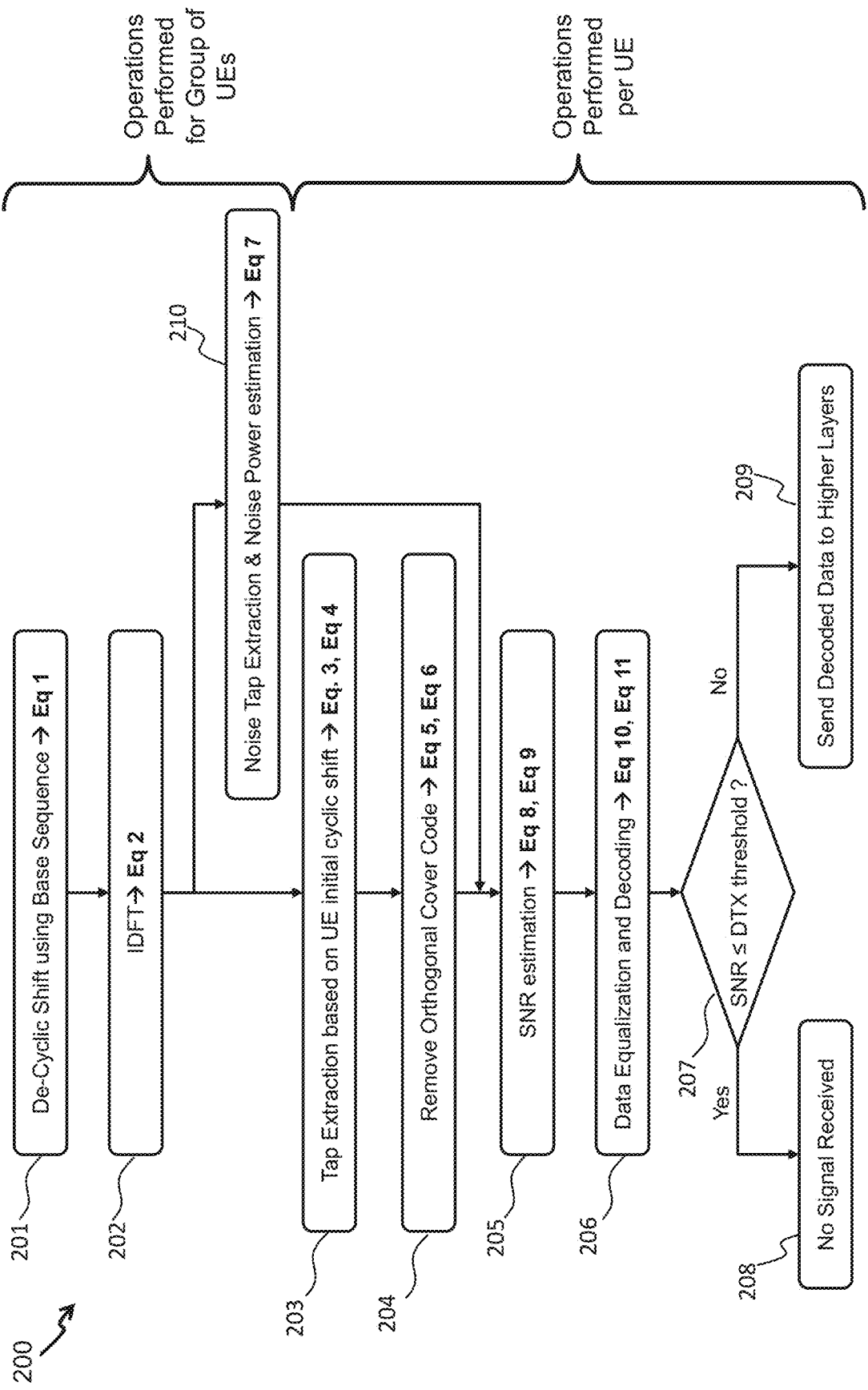
FIG. 2A is a flow chart of a process.
Figure 2B:
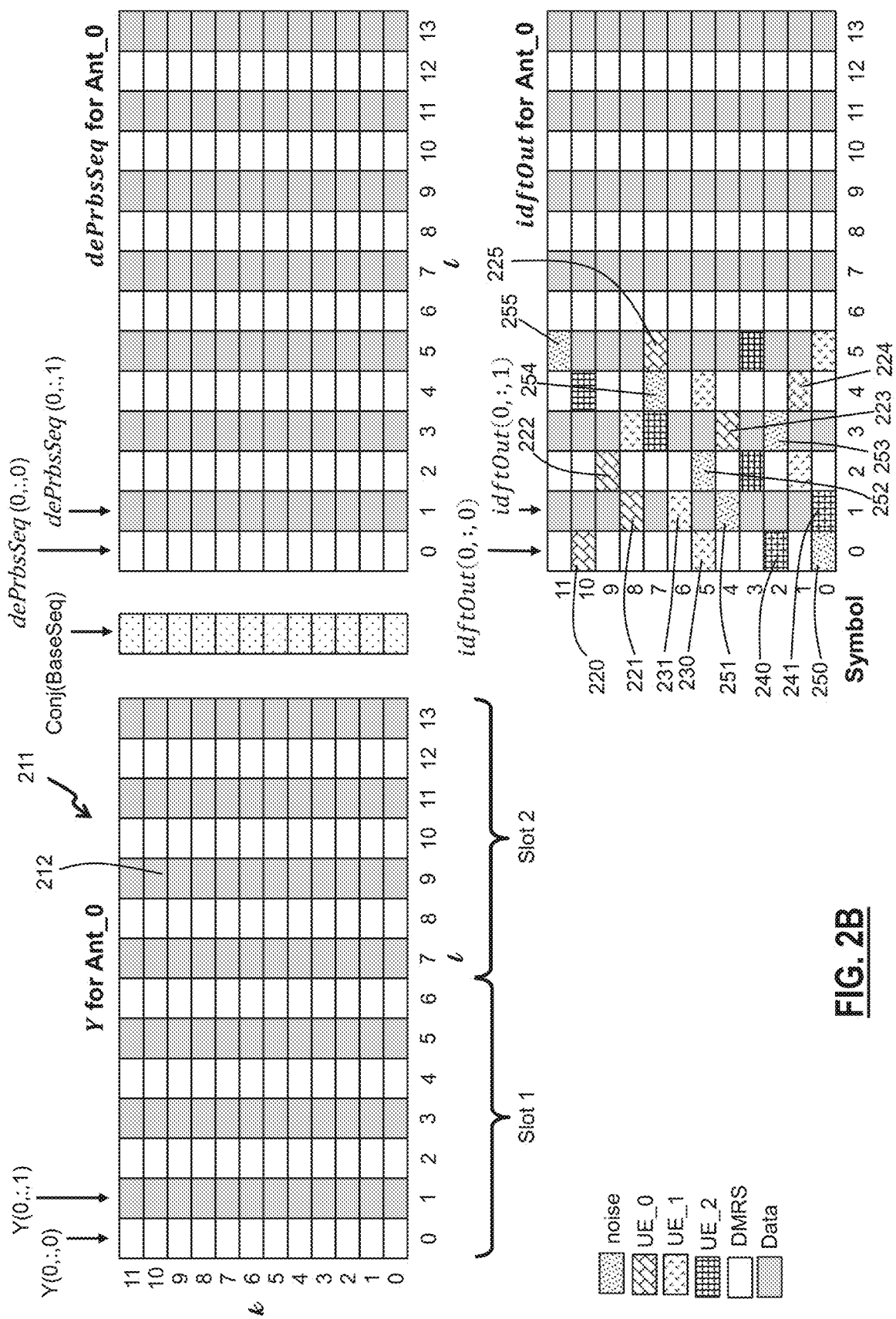
FIGS. 2B-2C are schematic diagrams showing signals and/or data at various stages of the process, in accordance with some embodiments.
Figure 2C:
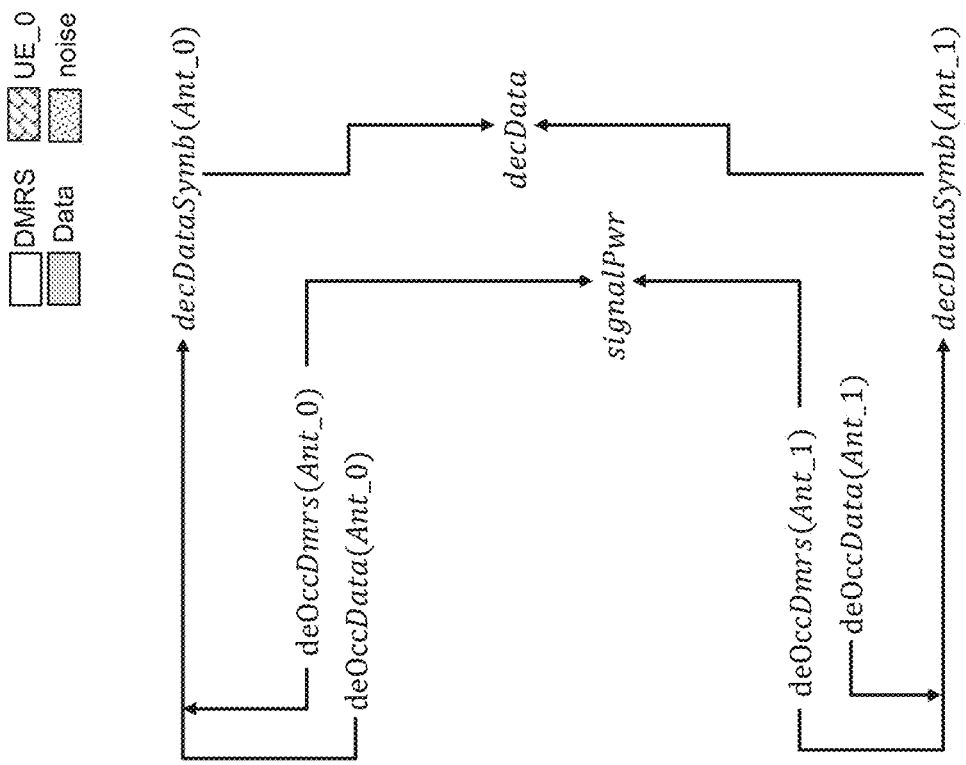
Figure 2C:
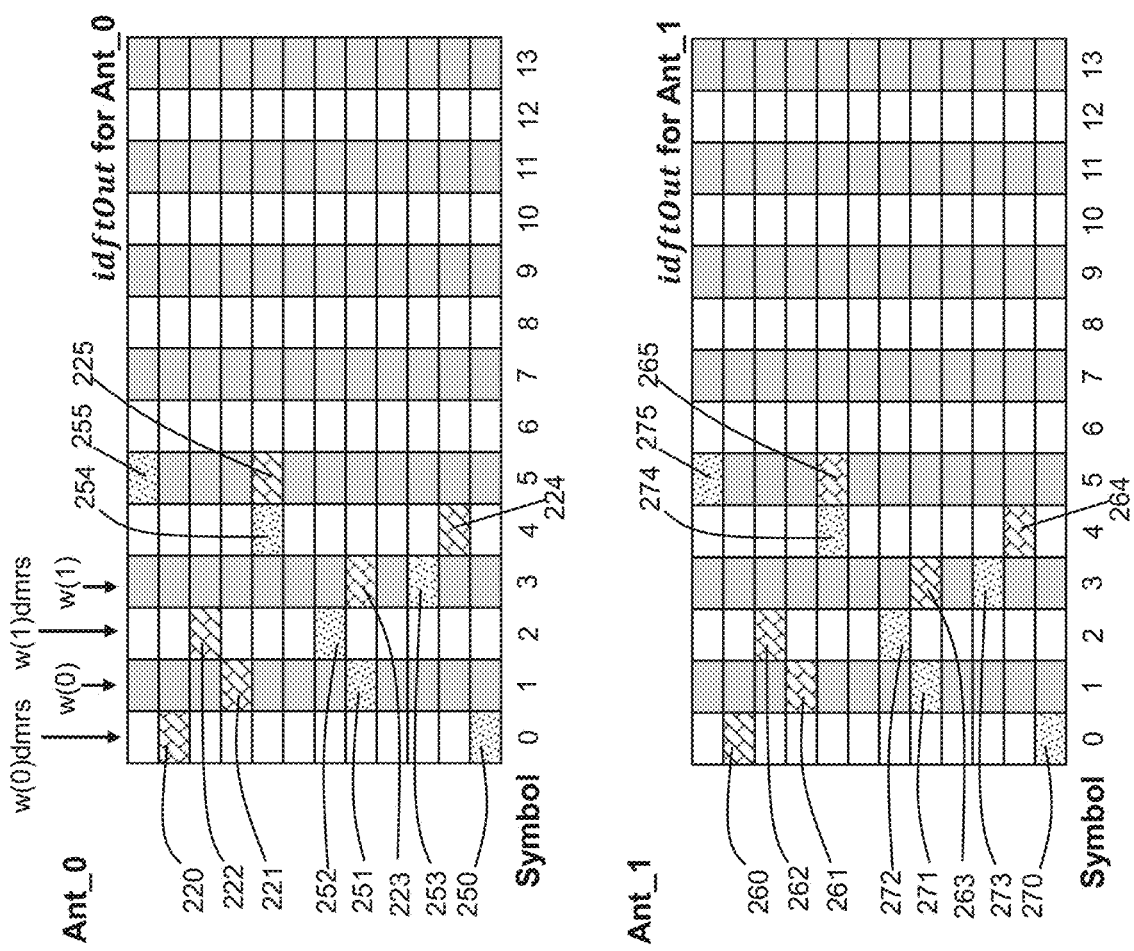

FIG. 2A is a flow chart of a process 200, and FIGS. 2B-2C are schematic diagrams showing signals and/or data at various stages of the process 200, in accordance with some embodiments. A description of the process 200 in one or more embodiments is provided herein with reference to FIGS. 2A-2C. In some embodiments, operations described with respect to FIGS. 2A-2C are performed by at least one processor and/or at a network device.

The process 200 is configured to process a signal received, over a physical uplink control channel (PUCCH) format 1 (FMT1), at an antenna of a network device. The received signal includes data and/or signaling from multiple terminal devices which are multiplexed on the same communications resource. In some embodiments, the network device corresponds to the base station 112 and/or the network device 120. In some embodiments, the terminal devices correspond to the terminal devices 102, 104 and/or the terminal device 130. For simplicity, a terminal device is referred to in the below description as UE.

In some embodiments, a network device comprises a plurality of antennas, and the network device receives a plurality of received signals each at a corresponding antenna among the plurality of antennas of the network device. Each of the plurality of received signals includes data and/or signaling from multiple UEs which are multiplexed on the same communications resource. Herein, multiple UEs which are multiplexed on the same communications resource are referred to as multiplexed UEs. For simplicity, the processing of a received signal at one antenna of the network device is described in detail herein with respect to some embodiments. The processing is similarly performed for other received signals at the corresponding other antennas of the network device.

Referring to FIG. 2B, a received signal Y at antenna Ant_0 of the network device is schematically represented in a resource grid 211. The resource grid 211 comprises a plurality of resource elements (k, l), where k is a frequency index in the frequency domain, and l is a time index in the time domain. In some embodiments, k indicates a subcarrier, and l indicates a symbol. For example, a resource element 212 at (10, 9) corresponds to subcarrier 10 and symbol 9. A predetermined number of consecutive subcarriers in the frequency domain and a predetermined number of consecutive symbols in the time domain form a resource block which is a unit of communications resource allocatable to UEs. Each resource block corresponds to a time slot (herein referred to as "slot") in the time domain. In the example configuration in FIG. 2B, the resource grid 211 includes two resource blocks corresponding to Slot 1 and Slot 2. The two slots form a subframe. Each resource block includes 12 subcarriers and 7 symbols. The specific numbers of subcarriers, symbols, resource blocks, slots, resource elements, or the like, in FIG. 2B are examples. Other numbers of subcarriers, symbols, resource blocks, slots, resource elements, or the like, are within the scopes of various embodiments.

The received signal Y is distributed among the resource elements of the resource grid 211. The received signal Y in a resource element (k, l) is represented as Y(ant, k, l), where ant is an antenna index corresponding to the antenna where the received signal Y is received. In the example configuration in FIG. 2B, the antenna is antenna Ant_0, the antenna index is zero, and the received signal Y in a resource element (k, l) is represented as (0, k, l). For another antenna, e.g., antenna Ant_1, the received signal Y in a resource element (k, l) is represented as (1, k, l), and so on. The received signal Y in a column of resource elements corresponding to the same symbol is represented with the notation ":" in place of k. For example, in FIG. 2B, Y(0, :, 0) indicates the received signal Y in 12 resource elements corresponding to symbol 0 and all subcarriers from 0 to 11. Similarly, Y(0, :, 1) indicates the received signal Y in 12 resource elements corresponding to symbol 1 and all subcarriers from 0 to 11. In this example, K which is a maximum value for k is 11. Other values of K are within the scopes of various embodiments.

In some embodiments, the received signal Y comprises data and demodulation reference signals (DMRS). The data include signaling or other information transmitted by the UEs to the network device, and the DMRS are used to determine channel estimates for demodulation of PUCCH. The data and DMRS are distributed in different symbols alternating in the time domain. For example, resource elements corresponding to even symbols (l=0, 2, 4, 6, 8, 10, 12) are for DMRS, and resource elements corresponding to odd symbols (l=1, 3, 5, 7, 9, 11, 13) are for data. In some embodiments, even symbols are referred to as DMRS symbols, and odd symbols are referred to as data symbols. The described arrangement is an example. A reversed arrangement where even symbols are data symbols, and odd symbols are DMRS symbols are within the scopes of various embodiments.

Returning to FIG. 2A, the process 200 comprises operations 201, 202 and 210 each of which is performed collectively for a plurality of UEs multiplexed on the same communications resource, e.g., the resource blocks described with respect to FIG. 2B. Other examples or sizes of the communications resource on which multiple UEs are multiplexed are within the scopes of various embodiments. The process 200 further comprises operations 203-209 which are performed individually for each of the UEs.

At operation 201, a de-cyclic shift is performed on the received signal Y to receive a demodulated signal sequence. In some embodiments, the de-cyclic shift is performed, using following Equation 1:

$$dePrbsSeq(ant,k,l)=Y(ant,k,l)*conj(\bar{r}_{u,v}(n)) \quad \text{(Equation 1)}.$$

In Equation 1, dePrbsSeq(ant, k, l) represents the demodulated signal sequence obtained after the de-cyclic shift, ant is the antenna index of the antenna receiving the received signal, k is the frequency index, l is the time index, Y(ant, k, l) is the received signal, conj is the complex conjugation operator, and $\bar{r}_{u,v}$ (n) is a base sequence. The demodulated signal sequence dePrbsSeq is represented using the same indices ant, k, l as the received signal Y. The base sequence is a standard feature, e.g., as described in the 3GPP. "Equation" is abbreviated as "Eq" in FIG. 2A.

FIG. 2B includes an example of a de-cyclic shift at operation 201, in accordance with some embodiments. In FIG. 2B, the complex conjugate of the base sequence, i.e., conj ($\bar{r}_{u,v}$(n)), is represented as Conj(BaseSeq). In the de-cyclic shift of the received signal Y, Y(0, :, 0) is multiplied with Conj(BaseSeq) resulting in dePrbsSeq(0,:,0), Y(0, :, 1) is multiplied with Conj(BaseSeq) resulting in dePrbsSeq(0,:, 1), and so on. A combination of dePrbsSeq(0,:,0), dePrbsSeq (0,:,1), and the like, constitutes the demodulated signal sequence dePrbsSeq.

Returning to FIG. 2A, at operation 202, an Inverse Discrete Fourier Transform (IDFT) transform is performed on the demodulated signal sequence dePrbsSeq to obtain a time domain sequence. In some embodiments, the IDFT is performed, using following Equation 2:

$$idftOut(ant,:,l)=idft(dePrbsSeq(ant,:,l)) \quad \text{(Equation 2)}.$$

In Equation 2, ":" represents all values of k from 0 to K, K is a maximum value for k, idftOut(ant, :, l) is the time domain sequence for the corresponding antenna at symbol l, and idft is the IDFT. The described IDFT is an example. Other transforms from the frequency domain to the time domain are within the scopes of various embodiments.

FIG. 2B includes an example of an IDFT at operation 202, in accordance with some embodiments. In FIG. 2B, the IDFT performed on dePrbsSeq(0, :,0) results in idftOut(0,:, 0), the IDFT performed on dePrbsSeq(0,:,1) results in idftOut(0,:,1), and so on. A combination of idftOut(0, :,0), dePrbsSeq(0,:,1), and the like, constitutes the time domain sequence idftOut. The time domain sequence idftOut is represented using the same indices ant and l as the received signal Y. However, the frequency index k is no longer represented in the time domain sequence idftOut. Instead of subcarriers, the time domain sequence idftOut includes blocks for each symbol, e.g., data blocks corresponding to data symbols, and DMRS blocks corresponding to DMRS symbols. For example, idftOut(0, :,0) corresponding to symbol 0, which is a DMRS symbol, and idftOut(0, :,0) includes 12 consecutive DMRS blocks some of which are designated as 220, 230, 240, 250 and will be described hereinafter. For another example, idftOut(0,:,1) corresponding to symbol 1, which is a data symbol, and idftOut(0,:,1) includes 12 consecutive data blocks some of which are designated as 221, 231, 241, 251 and will be described hereinafter. As described herein, the specific number, e.g., 12, of data blocks or DMRS blocks corresponding to a data symbol or a DMRS symbol in the time domain sequence idftOut is an example.

Returning to FIG. 2A, at operation 203, a tap extraction is performed for each UE among the plurality of UEs multiplexed on the same communications resource. In some embodiments, the tap extraction is performed to extract, from the time domain sequence, one or more data blocks corresponding to each UE, using following Equation 3:

$$\text{tapLocData}(l_{data}) = N_{SC}^{RB} - (n_{cs}(n_s, l) + m_0),$$

$$\text{tapExtractsData}(ant, l_{data}) = \text{idftOut}(ant, \text{tapLocData}(l), l) \quad \text{(Equation 3)}.$$

In some embodiments, the tap extraction is similarly performed to extract, from the time domain sequence, one or more DMRS blocks corresponding to each UE, using following Equation 4:

$$\text{tapLocDmrs}(l_{dmrs}) = N_{SC}^{RB} - (n_{cs}(n_s, l) + m_0),$$

$$\text{tapExtractsDmrs}(ant, l_{dmrs}) = \text{idftOut}(ant, \text{tapLocDmrs}(l), l) \quad \text{(Equation 4)}.$$

In Equation 3 and Equation 4, $N_{SC}^{RB}$ is a resource block size, $n_{cs}(n_s, l)$ is a cyclic shift value, $m_0$ is an initial cyclic shift that is unique for each UE. In Equation 3, tapLocData ($l_{data}$) is a location of a data block in a data symbol $l_{data}$ in the time domain sequence idftOut, idftOut(ant, tapLocData (l), l) is the data block at tapLocData(data), and tapExtractsData(ant, $l_{data}$) is the extracted data block. In Equation 4, tapLocDmrs($l_{dmrs}$) is a location of a DMRS block in a DMRS symbol $l_{dmrs}$ in the time domain sequence idftOut, idftOut(ant, tapLocDmrs(l), l) is the DMRS block at tapLocDmrs($l_{dmrs}$), and tapExtractsDmrs(ant, $l_{dmrs}$) is the extracted DMRS block. The cyclic shift value $n_{cs}(n_s, l)$ is a standard feature, e.g., as described in the 3GPP. The tapLocData($l_{data}$) and tapLocDmrs($l_{dmrs}$) are collectively referred to as an extraction index which is unique for each UE based on its also unique initial cyclic shift $m_0$.

FIG. 2B includes an example of a tap extraction at operation 203, in accordance with some embodiments. In the time domain sequence idftOut in FIG. 2B, data blocks and DMRS blocks corresponding three UEs, i.e., UE_0, UE_1, UE_2 are illustrated for symbols 0 to 5. UE_0, UE_1, UE_2 are examples of UEs multiplexed on the same communications resource. Other numbers of multiplexed UEs are within the scopes of various embodiments. For simplicity, data blocks and DMRS blocks corresponding to other UEs are omitted in FIG. 2B. Also for simplicity, data blocks and DMRS blocks corresponding to UE_0, UE_1, UE_2 in symbols 6 to 13 are omitted in FIG. 2B.

For UE_0, when the extraction index is determined, i.e., $NR_{SC}^{RB}(n_{cs}(n_s, l) + m_0)$ is determined for each symbol, using an initial cyclic shift $m_0$ unique for UE_0, the location of a data block or a DMRS block corresponding to UE_0 in each symbol is indicated by the extraction index. For example, the extraction index for UE_0 indicates that UE_0 has a DMRS block 220 at block 10 of symbol 0, a data block 221 at block 8 of symbol 1, a DMRS block 222 at block 9 of symbol 2, a data block 223 at block 4 of symbol 3, a DMRS block 224 at block 1 of symbol 4, a data block 225 at block 7 of symbol 5, or the like. In some embodiments, the extraction index of UE_0 is applicable to other antennas of the network device, e.g., for each and every antenna of the network device, UE_0 has a DMRS block at block 10 of symbol 0, a data block at block 8 of symbol 1, and so on.

For UE_1, because the initial cyclic shift $m_0$ of UE_1 is different from the initial cyclic shift $m_0$ of UE_0, the extraction index of UE_1 is also different from the extraction index of UE_0. In other words, the location of a data block or a DMRS block corresponding to UE_1 in each symbol is different from the location of a data block or a DMRS block corresponding to UE_0 in the same symbol. For example, the extraction index for UE_1 indicates that UE_1 has a DMRS block 230 at block 5 of symbol 0, a data block 231 at block 6 of symbol 1, a DMRS block at block 1 of symbol 2, a data block at block 8 of symbol 3, a DMRS block at block 5 of symbol 4, a data block at block 0 of symbol 5, or the like. Similarly to UE_0, the same extraction index of UE_1 is applicable to extract data blocks and DMRS blocks corresponding to UE_1 for other antennas of the network device.

For UE_2, because the initial cyclic shift $m_0$ of UE_2 is different from the initial cyclic shift $m_0$ of UE_0 or UE_1, the extraction index of UE_2 is also different from the extraction index of UE_0 and the extraction index of UE_1. In other words, the location of a data block or a DMRS block corresponding to UE_2 in each symbol is different from the locations of data blocks or DMRS blocks corresponding to UE_0, UE_1 in the same symbol. For example, the extraction index for UE_2 indicates that UE_2 has a DMRS block 240 at block 2 of symbol 0, a data block 241 at block 0 of symbol 1, a DMRS block at block 3 of symbol 2, a data block at block 7 of symbol 3, a DMRS block at block 10 of symbol 4, a data block at block 3 of symbol 5, or the like. Similarly to UE_0 and UE_1, the same extraction index of UE_2 is applicable to extract data blocks and DMRS blocks corresponding to UE_2 for other antennas of the network device.

FIG. 2B also includes an example of noise tap extraction for noise power determination, in accordance with some embodiments. The noise tap extraction corresponds to operation 210 of the process 200 in FIG. 2A, and is performed to extract, from the time domain sequence idftOut, a noise block in each symbol. A noise block is a block with no signal or data or DMRS from any of the multiplexed UEs. For example, assuming that only three UEs, i.e., UE_0, UE_1, UE_2, transmitted signaling on PUCCH FMT1, then except for DMRS blocks 220, 230, 240, all remaining blocks of symbol 0 are noise blocks. In some embodiments, for the purpose of determining noise power, it is sufficient to extract one noise block per symbol. The noise block for each symbol l is extracted based on a noise extraction index which is determined by the same $N_{SC}^{RB}(n_{cs}(n_s, l) + m_0)$ used to determine the extraction indices of UE_0, UE_1, UE_2, except that initial cyclic shift $m_0$ is replaced with a reserved initial cyclic shift that is not used by, or allotted to, any UE among the multiplexed UEs. As a result, the location of the extracted noise block in each symbol is different from the locations of data blocks or DMRS blocks corresponding to UE_0, UE_1, UE_2 in the same symbol. For example, the noise extraction index indicates that a noise block 250 at block 0 of symbol 0, a noise block 251 at block 4 of symbol 1, a noise block 252 at block 5 of symbol 2, a noise block 253 at block 2 of symbol 3, a noise block 254 at block 7 of symbol 4, a noise block 255 at block 11 of symbol 5, or the like, are to be extracted. Similarly to UE_0, UE_1, UE_2, the same noise extraction index is applicable to extract noise blocks for other antennas of the network device. Because the noise tap extraction is not specific to a particular UE, the noise tap extraction is considered as an operation performed collectively for the multiplexed UEs.

Data blocks, DMRS blocks and noise blocks included in the time domain sequence idftOut at the locations indicated by the corresponding extraction indices are extracted for subsequent processing. For example, for UE_0 and antenna Ant_0, tapExtractsData(ant, $l_{data}$) includes the extracted data blocks 221, 223, 225, and the like. For UE_0 and antenna Ant_0, tapExtractsDmrs(ant, $l_{dmrs}$) includes the extracted DMRS blocks 220, 222, 224, and the like. For antenna Ant_0, as well as for all other antennas, the extracted noise blocks are represented by noiseTapExtracts (ant, l) as described with respect to Equation 7, and include noise blocks 250-255.

Returning to FIG. 2A, at operation 204, a removal of orthogonal cover code (OCC) from the extracted data blocks and the extracted DMRS blocks, to correspondingly obtain OCC-removed data and OCC-removed DMRS is performed for each UE among the multiplexed UEs. The OCC is specific for each UE and was previously applied by the UE to the signaling sent by the UE over PUCCH FMT1 to the network device. In some embodiments, the OCC removal is performed using following Equation 5 and Equation 6:

$$deOccData(ant) = \text{mean}(tapExtractsData(ant, l_{data})^* \\ \text{conj}(w(l_{data}))) \quad \text{(Equation 5)},$$

$$deOccDmrs(ant) = \text{mean}(tapExtractsDmrs(ant, l_{dmrs})^* \\ \text{conj}(w(l_{dmrs}))) \quad \text{(Equation 6)}.$$

In Equation 5, $w(l_{data})$ is the OCC corresponding to the extracted data block tapExtractsData(ant, $l_{data}$), and deOccData(ant) is the OCC-removed data which is a mean of tapExtractsData(ant, $l_{data}$)*conj ($w(l_{data})$) across all data symbols in the time domain sequence. In Equation 6, $w(l_{dmrs})$ is the OCC corresponding to the extracted DMRS block tapExtractsDmrs(ant, $l_{dmrs}$), and deOccDmrs(ant) is the OCC-removed DMRS which is a mean of tapExtractsDmrs(ant, $l_{dmrs}$)*conj($w(l_{dmrs})$) across all DMRS symbols in the time domain sequence).

FIG. 2C includes an example of an OCC removal at operation 204, in accordance with some embodiments. FIG. 2C includes the same time domain sequence idftOut for antenna Ant_0, with the extracted data blocks, DMRS blocks and noise blocks as in FIG. 2B. FIG. 2C further includes a time domain sequence idftOut for antenna Ant_1, with correspondingly extracted data blocks 261, 263, 265, extracted DMRS blocks 260, 262, 264, and extracted noise blocks 270-275. The time domain sequence idftOut for antenna Ant_1 and the corresponding extracted data blocks, DMRS blocks and noise blocks are obtained by processing another received signal at the antenna Ant_1 in a manner similar to that described with respect to operations 201, 202, 203, 210. For simplicity, the extracted data blocks, DMRS blocks and noise blocks corresponding to UEs other than UE_0 and/or symbols other than symbols 0 to 5 are omitted.

For antenna Ant_0, the OCC corresponding to data symbol 1 is designated as w(0), the OCC corresponding to data symbol 3 is designated as w(1), and so on. The OCC w(0), w(1), and the like, are collectively represented as $w(l_{data})$ in Equation 5. According to Equation 5, the complex conjugate of w(0) corresponding to data symbol 1 is multiplied with the extracted data block 221 in the same data symbol 1 to obtain a first product, the complex conjugate of w(1) corresponding to data symbol 3 is multiplied with the extracted data block 223 in the same data symbol 3 to obtain a second product, and so on. A mean of the first product, the second product and the like across all data symbols 1, 3, 5, 7, 9, 11, 13 of the time domain sequence idftOut for antenna Ant_0 is determined as OCC-removed data deOccData(Ant_0), as indicated in FIG. 2C.

Still for antenna Ant_0, the OCC corresponding to DMRS symbol 0 is designated as w(0)dmrs, the OCC corresponding to DMRS symbol 2 is designated as w(1)dmrs, and so on. The OCC w(0)dmrs, w(1)dmrs, and the like, are collectively represented as $w(l_{dmrs})$ in Equation 6. According to Equation 6, the complex conjugate of w(0)dmrs corresponding to DMRS symbol 0 is multiplied with the extracted DMRS block 220 in the same DMRS symbol 0 to obtain a first product, the complex conjugate of w(1)dmrs corresponding to DMRS symbol 2 is multiplied with the extracted DMRS block 222 in the same DMRS symbol 2 to obtain a second product, and so on. A mean of the first product, the second product and the like across all DMRS symbols 0, 2, 4, 6, 8, 10, 12 of the time domain sequence idftOut for antenna Ant_0 is determined as OCC-removed DMRS deOccDmrs (Ant_0), as indicated in FIG. 2C.

For antenna Ant_1, Equation 5 and Equation 6 are applied to the time domain sequence idftOut for antenna Ant_1, the corresponding extracted data blocks 261, 263, 265 and the like, and the corresponding extracted DMRS blocks 260, 262, 264 and the like, in a manner similar to that described with respect to antenna Ant_0, to correspondingly obtain OCC-removed data deOccData(Ant_1) and OCC-removed DMRS deOccDmrs(Ant_1), as indicated in FIG. 2C. The received signals at the other antennas of the network device are processed in a similar manner.

Returning to FIG. 2A, at operation 205, a signal-to-noise ratio (SNR) of each UE among the multiplexed UEs is determined. The SNR of each UE is determined using noise power estimated at operation 210. In some embodiments, the noise power is determined using following Equation 7. The noise power is common to all multiplexed UEs. The SNR of each UE is determined further using signal power of each UE. In some embodiments, the signal power of each UE is determined using following Equation 8. The SNR of each UE is then determined, based on the signal power of the UE as obtained by Equation 8 and the noise power as obtained by Equation 7.

$$instNoisePwr = \text{mean}(\text{abs}(noiseTapExtracts(ant, l))^2), \quad \text{(Equation 7)}$$

$$signalPwr = \text{mean}(\text{abs}(deOccDmrs(ant))^2), \quad \text{(Equation 8)}$$

$$snr_{dB} = 10 * \log_{10}\left(\frac{signalPwr}{instNoisePwr}\right). \quad \text{(Equation 9)}$$

In Equation 7, noiseTapExtracts(ant, l) is the noise block extracted from the time domain sequence at symbol l, and instNoisePwr is the noise power which is a mean of abs (noiseTapExtracts(ant, l))$^2$ across all symbols in the time domain sequence for each antenna and also across all antennas of the network device. In Equation 8, signalPwr is the signal power of each UE which is a mean of abs (deOccDmrs(ant))$^2$ across all of the plurality of antennas. In Equation 9, $snr_{dB}$ is the SNR of the UE.

FIG. 2C includes an example of noise power estimation at operation 210 and an SNR determination at operation 205, in accordance with some embodiments.

In Equation 7, to determine the noise power, a noise block is extracted from each symbol of a time domain sequence of each antenna, as described with respect to operation 210 and FIG. 2B. In the example configuration in FIG. 2C, noise blocks 250-255 are extracted from corresponding symbols 0 to 5, and the like, in the time domain sequence idftOut for antenna Ant_0. Noise blocks 270-275 are extracted from corresponding symbols 0 to 5, and the like, in the time domain sequence idftOut for antenna Ant_1. All of the extracted noise blocks across all symbols and across all antennas are used in Equation 7 to determine the noise power. Specifically, the extracted noise blocks 250-255 and all other unnumbered extracted noise blocks in the time domain sequence idftOut for antenna Ant_0, the extracted noise blocks 270-275 and all other unnumbered extracted noise blocks in the time domain sequence idftOut for antenna Ant_1, as well as all extracted noise blocks in the time domain sequence for each of other antennas of the network device are used to determine the noise power. Each of the extracted noise blocks is used as noiseTapExtracts (ant, 1) in Equation 7 to calculate a corresponding abs (noiseTapExtracts(ant, 1))$^2$ value. A mean of all abs(noiseTapExtracts(ant, 1))$^2$ values, i.e., across all symbols for each antenna and also across all antennas, is obtained as the noise power instNoisePwr which is common to all UEs and all antennas of the network device.

In Equation 8, to determine the signal power for each UE, the OCC-removed DMRS of the UE at each antenna (as obtained at operation 204) is used. For example, assuming that the network device includes two antennas, antenna Ant_0 and antenna Ant_1, for UE_0, the two corresponding OCC-removed DMRS of UE_0, i.e., deOccDmrs(Ant_0) and deOccDmrs(Ant_1), are used to calculate the signal power signalPwr for UE_0, as schematically illustrated in FIG. 2C. When the network device includes M antennas, for each UE, M corresponding OCC-removed DMRS are used to calculate the signal power for the UE. Each of the OCC-removed DMRS corresponding to a UE is used as deOccDmrs(ant) in Equation 8 to calculate a corresponding abs(deOccDmrs(ant))$^n$ value. A mean of all abs(deOccDmrs (ant))$^2$ values, i.e., across all antennas, is obtained as the signal power signalPwr of the UE in question.

In Equation 9, to determine the SNR of a UE, the signalPwr of the same UE as obtained in accordance with Equation 8 and the noise power instNoisePwr as obtained in accordance with Equation 7 are used. The same noise power instNoisePwr is used in Equation 9 to determine an SNR for each UE among the multiplexed UEs.

Returning to FIG. 2A, at operation 206, data equalization and decoding are performed for each UE among the multiplexed UEs. In some embodiments, the data equalization and decoding are performed using following Equation 10 and Equation 11:

$$decDataSymb(ant)=deOccData(ant)*conj(deOccDmrs(ant)) \quad \text{(Equation 10)},$$

$$decData=mean(decDataSymb) \quad \text{(Equation 11)}.$$

In Equation 10, decDataSymb(ant) is decoded data of each UE obtained from the received signal at the corresponding antenna. In Equation 11, decData is the decoded data of the same UE which is a mean of decDataSymb(ant) across all antennas of the network device.

FIG. 2C includes an example of data equalization and decoding at operation 206, in accordance with some embodiments.

In Equation 10, decDataSymb(ant) of each UE at each antenna is determined from the OCC-removed data deOccData(ant) and OCC-removed DMRS deOccDmrs(ant) of the same UE at the same antenna, as obtained at operation 204. For example, as schematically illustrated in FIG. 2C, decDataSymb(Ant_0) of UE_0 at antenna Ant_0 is determined from the OCC-removed data deOccData(Ant_0) and OCC-removed DMRS deOccDmrs(Ant_0) of the same UE_0 at the same antenna Ant_0. For another example, as schematically illustrated in FIG. 2C, decDataSymb(Ant_1) of UE_0 at antenna Ant_1 is determined from the OCC-removed data deOccData(Ant_1) and OCC-removed DMRS deOccDmrs(Ant_1) of the same UE_0 at the same antenna Ant_1.

In Equation 11, to determine the decoded data decData for each UE, the decDataSymb of the UE at each antenna (as obtained from Equation 10) is used. For example, assuming that the network device includes two antennas, antenna Ant_0 and antenna Ant_1, for UE_0, a mean of the two corresponding decDataSymb(Ant_0) and decDataSymb (Ant_1) of UE_0 is calculated as the decoded data decData for UE_0, as schematically illustrated in FIG. 2C. When the network device includes M antennas, for each UE, M corresponding decDataSymb(Ant_0), decDataSymb (Ant_0), and the like, are used in Equation 11 to calculate the decoded data for the UE. A mean of all of decDataSymb (Ant_0), decDataSymb(Ant_0), and the like, i.e., across all antennas, is obtained as the decoded data decData for the UE in question.

Returning to FIG. 2A, at operation 207, for each UE, the SNR of the UE as obtained at operation 205 is compared with a predetermined discontinuous transmission (DTX) threshold. In some embodiments, the DTX threshold is an SNR level (or SNR value) that corresponds to no signal from an UE being received at a network device. Other thresholds are within the scopes of various embodiments.

At operation 208 (Yes from operation 207), in response to the SNR of the UE being equal to or lower than the predetermined threshold, the network device (or a processor thereof) determines that the received signals (at all antennas of the network device) include no signal from the particular UE in question. In some embodiments, the network device (or a processor thereof) is configured to wait for signaling from the particular UE in question in a next PUCCH FMT1 reception.

At operation 209 (No from operation 207), in response to the SNR of the UE being higher than the predetermined threshold, the network device (or a processor thereof) determines that the received signals (at all antennas of the network device) include signaling from the particular UE in question, and sends the decoded data of the UE (as obtained at operation 206) to at least one higher layer in a protocol stack of the network device, e.g., to one or more of the MAC layer 124, RLC layer 126, PDCP layer 128, or the like.

At the one or more higher layers, the network device is configured to utilize the decoded data of the UE for handling further communications with the UE. For example, when the decoded data include a NACK which indicates that downlink data previously sent to the UE were not successfully received by the UE, the network device retransmits the downlink data. For another example, when the decoded data include a NACK which indicates that previously re-transmitted downlink data were not successfully received by the UE and the number of re-transmissions has reached a predetermined limit, the network device stops retransmitting the unsuccessfully re-transmitted downlink data. For yet another example, when the decoded data include an ACK which indicates that previously transmitted or re-transmitted downlink data were successfully received by the UE, the network device transmits new downlink data. Other actions of the network device and/or the communications system 100 for handling further communications with a UE based on the decoded data of the UE are within the scopes of various embodiments.

As described herein, processing of PUCCH FMT1 signals in accordance with other approaches is performed in the frequency domain. The whole PUCCH FMT1 signal processing at each antenna of the network device, is individually performed for one UE at a time. Assuming that a network device receives PUCCH FMT1 signals from N multiplexed UEs, the same set of PUCCH FMT1 signal processing is performed N times by the network device, per antenna. When the number N of multiplexed UEs increases, processing of PUCCH FMT1 signals at the network device may become highly complex and may consume an excessive amount of time, computing power/resources, or the like. The complexity and/or time/resource consumption of PUCCH FMT1 signal processing in accordance with the other approaches limit(s) the number of UEs that can be multiplexed on the same communications resource.

In some embodiments, by processing PUCCH FMT1 signals at a network device in the time domain, rather than in the frequency domain as in other approaches, it is possible to perform one or more operations collectively for multiple multiplexed UEs. Examples of operations collectively performed for multiple multiplexed UEs include one or more of operations 201, 202, 210 in the process 200. As a result, the amount of time, computing power/resources, or the like, for processing PUCCH FMT1 signals at each antenna is/are reduced, in one or more embodiments. In at least one embodiment, the reduced complexity and/or time/resource consumption of PUCCH FMT1 signal processing permits more UEs to be multiplexed on the same communications resource than in the other approaches. Compared to the other approaches, network efficiency and/or network capacity is/are increased, because the number of multiplexed UEs that can be processed in a given time is increased. In some embodiments, the reduced complexity of PUCCH FMT1 signal processing at the network device further helps in better scheduling for multiplexed UEs.

Figure 3:
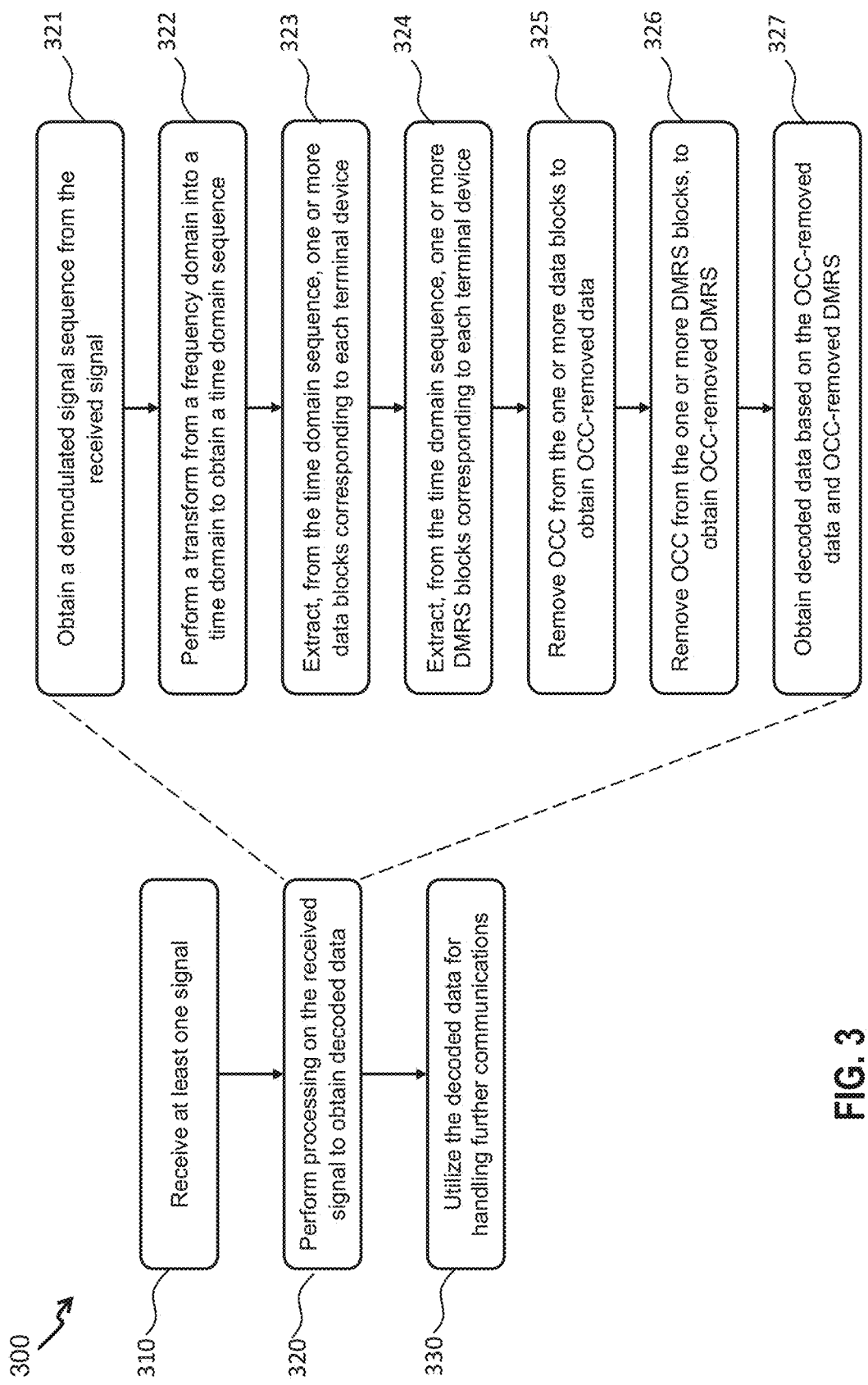
FIG. 3 is a flow chart of a method, in accordance with some embodiments.

FIG. 3 is a flow chart of a method 300, in accordance with some embodiments. In at least one embodiment, one or more or all operations of the method 300 are performed by at least one processor and/or at a network device corresponding to the base station 112 and/or the network device 120. In some embodiments, one or more operations of the method 300 correspond to one or more operations of the process 200 described with respect to one or more of FIGS. 2A-2C.

At operation 310, a network device receives at least one signal from a plurality of terminal devices over a PUCCH FMT1. For example, the received signal is received by an antenna and corresponding receiver circuitry of the network device.

At operation 320, a processor at the network device, which is coupled to the receiver circuitry, performs processing on the received signal to obtain decoded data corresponding to the plurality of terminal devices. In some embodiments, operation 320 includes one or more of operations 321-327.

At operation 321, the processor obtains a demodulated signal sequence from the received signal. For example, the processor uses a base sequence to obtain the demodulated signal sequence from the received signal, as described with respect to operation 201 and/or Equation 1.

At operation 322, the processor performs, on the demodulated signal sequence, a transform from a frequency domain into a time domain to obtain a time domain sequence. In an example as described with respect to operation 202 and/or Equation 2, the processor performs an IDFT. Other transforms from the frequency domain to the time domain are within the scopes of various embodiments.

At operation 323, the processor extracts, from the time domain sequence, one or more data blocks corresponding to each terminal device among the plurality of terminal devices. For example, the data extraction is based on an initial cyclic shift that is unique for each terminal device among the plurality of terminal devices, as described with respect to operation 203 and/or Equation 3.

At operation 324, the processor extracts, from the time domain sequence, one or more DMRS blocks corresponding to each terminal device among the plurality of terminal devices. For example, the DMRS extraction is based on the initial cyclic shift that is unique for each terminal device among the plurality of terminal devices, as described with respect to operation 203 and/or Equation 4.

At operation 325, the processor removes, for each terminal device among the plurality of terminal devices, OCC of the terminal device from the one or more extracted data blocks to obtain OCC-removed data, for example, as described with respect to operation 204 and/or Equation 5.

At operation 326, the processor removes, for each terminal device among the plurality of terminal devices, OCC of the terminal device from the one or more extracted DMRS blocks to obtain OCC-removed DMRS, for example, as described with respect to operation 204 and/or Equation 6.

At operation 327, the processor obtains, for each terminal device among the plurality of terminal devices, decoded data based on the OCC-removed data and OCC-removed DMRS of the terminal device, for example, as described with respect to operation 206, and/or Equations 10, 11. The obtained decoded data is used at operation 330.

At operation 330, the processor utilizes the decoded data for handling further communications with the plurality of terminal devices, for example, as described with respect to one or more of operations 208, 209.

In some embodiments, the processor further performs one or more of the following operations. The processor extracts, from the time domain sequence, noise blocks to determine noise power based on the extracted noise blocks, for example, as described with respect to operation 210 and/or Equation 7. The processor determines an SNR of each terminal device among the plurality of terminal devices based on the noise power and the OCC-removed DMRS of the terminal device, for example, as described with respect to operation 205 and/or Equations 8, 9. The processor compares the SNR of each terminal device with a predetermined threshold, for example, as described with respect to operation 207. Depending on a result of the comparison, the processor performs one or more further operations, for example, as described with respect to operations 208, 209. In at least one embodiment, one or more advantages described herein are achievable by the method 300.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 4:
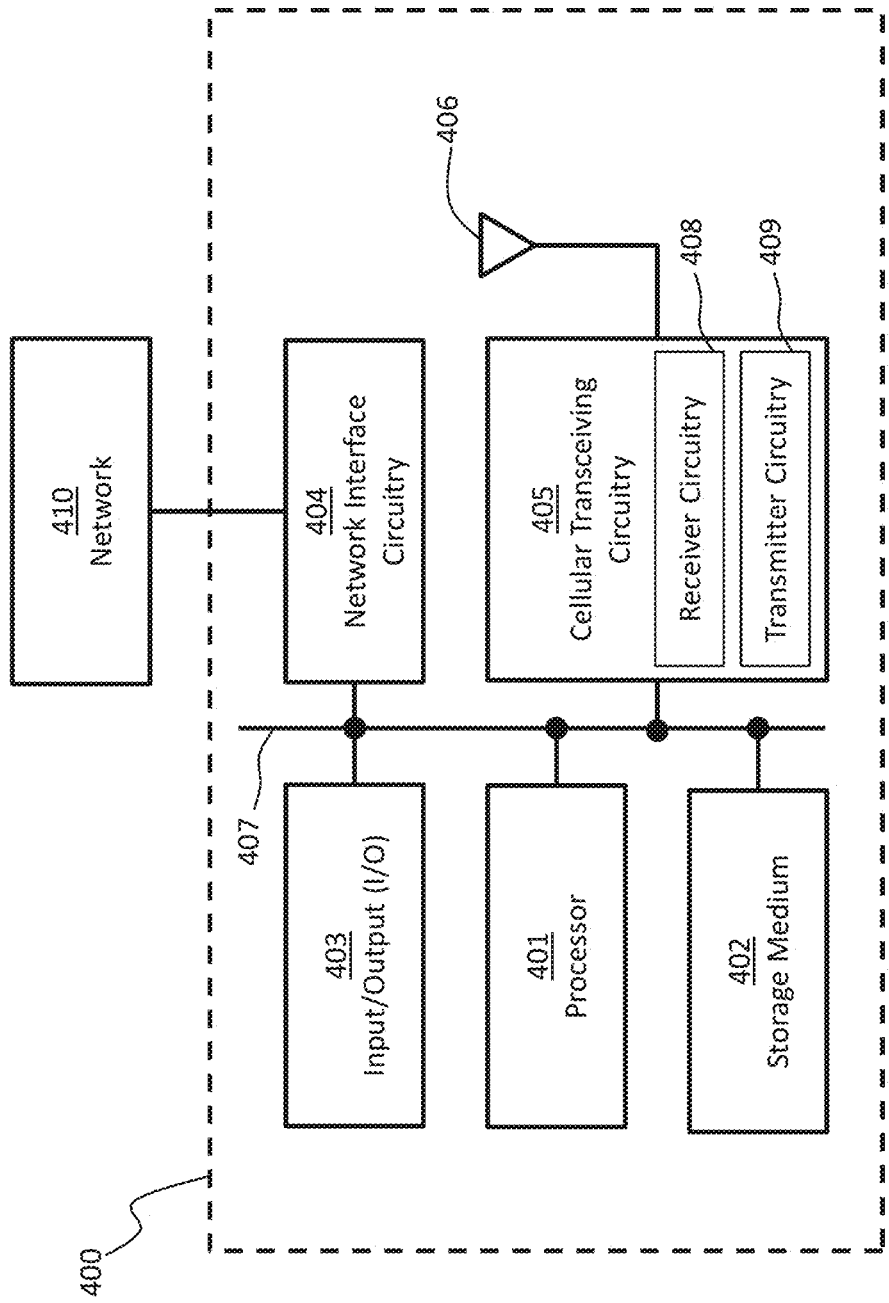
FIG. 4 is a block diagram of an example hardware configuration of equipment in a communications system, in accordance with some embodiments.

FIG. 4 is a block diagram of an example hardware configuration of equipment 400 in a communications system, in accordance with some embodiments. The equipment 400 is configurable to operate as user equipment or a network device, as described herein. The equipment 400 comprises a hardware processor 401, a non-transitory, computer-readable storage medium 402, an input/output (I/O) interface 403, network interface circuitry 404, cellular transceiving circuitry 405 with at least one antenna 406, and a bus 407 which couples the processor 401, the storage medium 402, the I/O interface 403, the network interface circuitry 404, and the cellular transceiving circuitry 405 together. In equipment where cellular communication is not required, the cellular transceiving circuitry 405 and the associated antenna 406 are omitted.

The processor 401 is configured to execute computer program codes encoded in the storage medium 402 in order to cause the equipment 400 to perform a portion or all of the described processes and/or methods. In one or more embodiments, the processor 401 comprises a central processing unit (CPU), a multi-processor, a distributed processing system, an application specific integrated circuit (ASIC), and/or a suitable processing unit.

The storage medium 402, amongst other things, is encoded with, i.e., stores, computer program codes, i.e., a set of executable instructions to be executed by the processor 401, such as one or more algorithms, programs, applications for a system, component, equipment, and/or module, as described with respect to one or more of FIGS. 1A-3. Execution of the sets of instructions by hardware processor 401 implements a portion or all of the processes and/or methods described herein in accordance with one or more embodiments (hereinafter, the noted processes and/or methods). In one or more embodiments, the storage medium 402 comprises an electronic, magnetic, optical, electromagnetic, infrared, and/or a semiconductor system (or apparatus or device). For example, the storage medium 402 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the storage medium 402 includes a compact disk-read only memory (CD-ROM), a compact disk-read/write (CD-R/W), and/or a digital video disc (DVD).

The I/O interface 403 includes an input device, an output device and/or a combined input/output device for enabling a user and/or external circuitry/equipment to interact with equipment 400. An input device comprises, for example, a keyboard, keypad, mouse, trackball, trackpad, touchscreen, and/or cursor direction keys for communicating information and commands to the processor 401. An output device comprises, for example, a display, a printer, a voice synthesizer, etc. for communicating information to a user.

The network interface circuitry 404 is coupled to a network 410 so that the processor 401 and storage medium 402 are capable of connecting to other equipment via the network 410. The network interface circuitry 404 includes wireless network interfaces such as BLUETOOTH, WIFI, WIMAX, GPRS, LTE, 5G, 6G, WCDMA, or the like; or wired network interfaces such as ETHERNET, USB, IEEE-864, or the like. In one or more embodiments, a portion or all of noted processes and/or methods, is implemented in two or more equipment 400 connected over the network 410.

The cellular transceiving circuitry 405 includes receiver circuitry 408 with an associated decoder, and transmitter circuitry 409 with an associated encoder. The receiver circuitry 408 and the transmitter circuitry 409 are coupled to the at least one antenna 406 to correspondingly receive and transmit data through the at least one antenna 406. In some embodiments, the receiver circuitry 408 and the transmitter circuitry 409 are coupled to the same antenna. In one or more embodiments, the receiver circuitry 408 and the transmitter circuitry 409 are coupled to different antennas. The cellular transceiving circuitry 405 is configured to receive and transmit data, using the at least one antenna 406 and the receiver circuitry 408 and/or transmitter circuitry 409, over cellular communication under control of the processor 401. In some embodiments, at least one of the receiver circuitry 408 or the transmitter circuitry 409 comprises one or more of integrated circuits, power amplifier circuitry, low-noise input amplifier circuitry, passive radio frequency (RF) components, other circuitry for handling RF wireless signals, or the like.

In some embodiments, a portion or all of the described processes and/or methods is implemented as a standalone software application for execution by a processor. In some embodiments, a portion or all of the described processes and/or methods is implemented as a software application that is a part of an additional software application. In some embodiments, a portion or all of the described processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

In accordance with aspect (1), a network device comprises receiver circuitry configured to receive a signal from a plurality of terminal devices, the signal received over a physical uplink control channel (PUCCH) format 1 (FMT1); and a processor coupled to the receiver circuitry. The processor is configured to perform processing on the received signal to obtain decoded data corresponding to the plurality of terminal devices; and utilize the decoded data for handling further communications with the plurality of terminal devices. In the processing, the processor is configured to obtain a demodulated signal sequence from the received signal; perform, on the demodulated signal sequence, a transform from a frequency domain into a time domain to obtain a time domain sequence; and extract, from the time domain sequence, one or more data blocks corresponding to each terminal device among the plurality of terminal devices.

In accordance with aspect (2), in the network device of aspect (1), the processor is configured to, using a base sequence, obtain the demodulated signal sequence from the received signal.

In accordance with aspect (3), in the network device of aspect (1) or (2), the transform from the frequency domain into the time domain comprises an Inverse Discrete Fourier Transform (IDFT).

In accordance with aspect (4), in the network device of any one of aspects (1) to (3), the processor is configured to extract, from the time domain sequence and based on an initial cyclic shift that is unique for each terminal device among the plurality of terminal devices, the one or more data blocks corresponding to the terminal device.

In accordance with aspect (5), in the network device of any one of aspects (1) to (4), the processor is further configured to extract, from the time domain sequence and based on the initial cyclic shift that is unique for each terminal device among the plurality of terminal devices, one or more demodulation reference signal (DMRS) blocks corresponding to the terminal device.

In accordance with aspect (6), in the network device of aspect (5), in the processing, the processor is further configured to, for each terminal device among the plurality of terminal devices, remove orthogonal cover code (OCC)

from the one or more data blocks and the one or more DMRS blocks, to correspondingly obtain OCC-removed data and OCC-removed DMRS.

In accordance with aspect (7), in the network device of aspect (6), in the processing, the processor is further configured to, for each terminal device among the plurality of terminal devices, obtain decoded data, based on the OCC-removed data and OCC-removed DMRS of the terminal device.

In accordance with aspect (8), in the network device of any one of aspects (5) to (7), in the processing, the processor is further configured to: extract, from the time domain sequence, noise blocks; determine noise power, based on the extracted noise blocks; and determine a signal-to-noise ratio (SNR) of each terminal device among the plurality of terminal devices, based on the noise power and the OCC-removed DMRS of the terminal device.

In accordance with aspect (9), in the network device of aspect (8), the processor is configured to extract the noise blocks based on a reserved initial cyclic shift that is not used by, or allotted to, any terminal device among the plurality of terminal devices.

In accordance with aspect (10), in the network device of aspect (8), the processor is further configured to, for each terminal device among the plurality of terminal devices, in response to the SNR of the terminal device being equal to or lower than a predetermined threshold, determine that the received signal includes no signal from the terminal device, and in response to the SNR of the terminal device being higher than the predetermined threshold, send the decoded data of the terminal device to at least one higher layer in a protocol stack of the network device.

In accordance with aspect (11), a non-transitory, tangible computer readable storage medium stores a computer program that, when executed by a processor, causes the processor to perform an Inverse Discrete Fourier Transform (IDFT) transform to obtain a time domain sequence from each received signal among a plurality of received signals, the plurality of signals correspondingly received at a plurality of antennas from a plurality of terminal devices over a physical uplink control channel (PUCCH) format 1 (FMT1). The processor is further caused to, for each terminal device among the plurality of terminal devices, extract, from the time domain sequence, one or more data blocks corresponding to the terminal device, obtain decoded data of the terminal device, based on the one or more data blocks, and utilize the decoded data for handling further communications with the terminal device.

In accordance with aspect (12), in the storage medium of aspect (11), the computer program, when executed by the processor, further causes the processor to obtain a demodulated signal sequence from the received signal; perform the IDFT on the demodulated signal sequence to obtain the time domain sequence; extract, from the time domain sequence, noise blocks; and determine noise power, based on the extracted noise blocks.

In accordance with aspect (13), in the storage medium of aspect (12), the computer program, when executed by the processor, further causes the processor to, for each terminal device among the plurality of terminal devices, extract, from the time domain sequence, one or more demodulation reference signal (DMRS) blocks corresponding to the terminal device; determine a signal-to-noise ratio (SNR) of the terminal device, based on the noise power and the DMRS blocks; obtain the decoded data of the terminal device, based on the one or more data blocks and the one or more DMRS blocks; in response to the SNR of the terminal device being equal to or lower than a predetermined threshold, determine that the received signals include no signal from the terminal device; and in response to the SNR of the terminal device being higher than the predetermined threshold, send the decoded data of the terminal device to at least one higher layer in a protocol stack.

In accordance with aspect (14), in the storage medium of anyone of aspects (11) to (13), the computer program, when executed by the processor, further causes the processor to perform a de-cyclic shift using Equation 1, and perform the IDFT on the demodulated signal sequence to obtain the time domain sequence using Equation 2.

In accordance with aspect (15), in the storage medium of aspect (14), the computer program, when executed by the processor, further causes the processor to, for each terminal device among the plurality of terminal devices, extract, from the time domain sequence, the one or more data blocks corresponding to the terminal device using Equation 3; and extract, from the time domain sequence, one or more demodulation reference signal (DMRS) blocks corresponding to the terminal device using Equation 4.

In accordance with aspect (16), in the storage medium of aspect (15), the computer program, when executed by the processor, further causes the processor to, for each terminal device among the plurality of terminal devices, remove orthogonal cover code (OCC) from the one or more data blocks and the one or more DMRS blocks to correspondingly obtain OCC-removed data and OCC-removed DMRS, using Equation 5 and Equation 6.

In accordance with aspect (17), in the storage medium of aspect (16), the computer program, when executed by the processor, further causes the processor to extract, from the time domain sequence, one or more noise blocks, using Equation 3 with $m_0$ being a reserved initial cyclic shift that is not used by, or allotted to, any terminal device among the plurality of terminal devices. The processor is further caused to determine noise power using Equation 7. The processor is further caused to, for each terminal device among the plurality of terminal devices, determine signal power of the terminal device using Equation 8, and determine a signal-to-noise ratio (SNR) of the terminal device using following Equation 9.

In accordance with aspect (18), in the storage medium of aspect (16) or (17), the computer program, when executed by the processor, further causes the processor to, for each terminal device among the plurality of terminal devices, perform data equalization and data decoding using Equation 10 and Equation 11.

In accordance with aspect (19), in the storage medium of aspect (17) or (18), the computer program, when executed by the processor, further causes the processor to, for each terminal device among the plurality of terminal devices, in response to the SNR of the terminal device being equal to or lower than a predetermined threshold, determine that the received signals include no signal from the terminal device; and in response to the SNR of the terminal device being higher than the predetermined threshold, send the decoded data of the terminal device to at least one higher layer in a protocol stack.

In accordance with aspect (20), a method performed at least in part by a processor comprises: obtaining, using a base sequence, a demodulated signal sequence from a signal received over a physical uplink control channel (PUCCH) format 1 (FMT1); performing an Inverse Discrete Fourier Transform (IDFT) on the demodulated signal sequence to obtain a time domain sequence; extracting, from the time domain sequence and based on an initial cyclic shift that is unique for a terminal device, one or more data blocks and one or more demodulation reference signal (DMRS) blocks corresponding to the terminal device; removing orthogonal cover code (OCC) from the one or more data blocks and the one or more DMRS blocks, to correspondingly obtain OCC-removed data and OCC-removed DMRS; obtaining decoded data, based on the OCC-removed data and OCC-removed DMRS of the terminal device; and utilizing the decoded data for handling further communications with the terminal device.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A network device, comprising:
receiver circuitry configured to receive a signal from a plurality of terminal devices, the signal received over a physical uplink control channel (PUCCH) format 1 (FMT1); and
a processor coupled to the receiver circuitry, and configured to:
perform processing on the received signal to obtain decoded data corresponding to the plurality of terminal devices; and
utilize the decoded data for handling further communications with the plurality of terminal devices,
wherein, in the processing, the processor is configured to:
obtain a demodulated signal sequence from the received signal;
perform, on the demodulated signal sequence, a transform from a frequency domain into a time domain to obtain a time domain sequence; and
extract, from the time domain sequence, one or more data blocks corresponding to each terminal device among the plurality of terminal devices.

2. The network device of claim 1, wherein
the processor is configured to, using a base sequence, obtain the demodulated signal sequence from the received signal.

3. The network device of claim 1, wherein
the transform from the frequency domain into the time domain comprises an Inverse Discrete Fourier Transform (IDFT).

4. The network device of claim 1, wherein
the processor is configured to extract, from the time domain sequence and based on an initial cyclic shift that is unique for each terminal device among the plurality of terminal devices, the one or more data blocks corresponding to the terminal device.

5. The network device of claim 4, wherein
the processor is further configured to extract, from the time domain sequence and based on the initial cyclic shift that is unique for each terminal device among the plurality of terminal devices, one or more demodulation reference signal (DMRS) blocks corresponding to the terminal device.

6. The network device of claim 5, wherein
in the processing, the processor is further configured to, for each terminal device among the plurality of terminal devices,
remove orthogonal cover code (OCC) from the one or more data blocks and the one or more DMRS blocks, to correspondingly obtain OCC-removed data and OCC-removed DMRS.

7. The network device of claim 6, wherein
in the processing, the processor is further configured to, for each terminal device among the plurality of terminal devices,
obtain decoded data, based on the OCC-removed data and OCC-removed DMRS of the terminal device.

8. The network device of claim 7, wherein
in the processing, the processor is further configured to:
extract, from the time domain sequence, noise blocks;
determine noise power, based on the extracted noise blocks; and
determine a signal-to-noise ratio (SNR) of each terminal device among the plurality of terminal devices, based on the noise power and the OCC-removed DMRS of the terminal device.

9. The network device of claim 8, wherein
the processor is configured to extract the noise blocks based on a reserved initial cyclic shift that is not used by, or allotted to, any terminal device among the plurality of terminal devices.

10. The network device of claim 8, wherein
the processor is further configured to, for each terminal device among the plurality of terminal devices,
in response to the SNR of the terminal device being equal to or lower than a predetermined threshold, determine that the received signal includes no signal from the terminal device; and
in response to the SNR of the terminal device being higher than the predetermined threshold, send the decoded data of the terminal device to at least one higher layer in a protocol stack of the network device.

11. A non-transitory, tangible computer readable storage medium storing a computer program that, when executed by a processor, causes the processor to:
perform an Inverse Discrete Fourier Transform (IDFT) transform to obtain a time domain sequence from each received signal among a plurality of received signals, the plurality of signals correspondingly received at a plurality of antennas from a plurality of terminal devices over a physical uplink control channel (PUCCH) format 1 (FMT1); and
for each terminal device among the plurality of terminal devices,
extract, from the time domain sequence, one or more data blocks corresponding to the terminal device;
obtain decoded data of the terminal device, based on the one or more data blocks; and
utilize the decoded data for handling further communications with the terminal device.

12. The storage medium of claim 11, wherein the computer program, when executed by the processor, further causes the processor to:
obtain a demodulated signal sequence from the received signal;
perform the IDFT on the demodulated signal sequence to obtain the time domain sequence;
extract, from the time domain sequence, noise blocks; and
determine noise power, based on the extracted noise blocks.

13. The storage medium of claim 12, wherein the computer program, when executed by the processor, further causes the processor to, for each terminal device among the plurality of terminal devices:

extract, from the time domain sequence, one or more demodulation reference signal (DMRS) blocks corresponding to the terminal device;

determine a signal-to-noise ratio (SNR) of the terminal device, based on the noise power and the DMRS blocks;

obtain the decoded data of the terminal device, based on the one or more data blocks and the one or more DMRS blocks;

in response to the SNR of the terminal device being equal to or lower than a predetermined threshold, determine that the received signals include no signal from the terminal device; and in response to the SNR of the terminal device being higher than the predetermined threshold, send the decoded data of the terminal device to at least one higher layer in a protocol stack.

14. The storage medium of claim 11, wherein the computer program, when executed by the processor, further causes the processor to:

perform a de-cyclic shift, using following Equation 1:

$$dePrbsSeq(ant,k,l)=Y(ant,k,l)*conj(\bar{r}_{u,v}(n)) \quad \text{(Equation 1)},$$

where
dePrbsSeq(ant, k, l) represents a demodulated signal sequence obtained after the de-cyclic shift,
ant is an antenna index of a corresponding antenna receiving the received signal,
k is a frequency index,
l is a time index,
Y (ant, k, l) is the received signal,
conj is a complex conjugation operator, and
$\bar{r}_{u,v}(n)$ is a base sequence; and perform the IDFT on the demodulated signal sequence to obtain the time domain sequence, using following Equation 2:

$$idftOut(ant,:,l)=idft(dePrbsSeq(ant,:,l)) \quad \text{(Equation 2)},$$

where
":" includes all values of k from 0 to K, and K is a maximum value for k,
idftOut(ant, :, l) is the time domain sequence for the corresponding antenna at symbol l, and
idft is the IDFT.

15. The storage medium of claim 14, wherein the computer program, when executed by the processor, further causes the processor to, for each terminal device among the plurality of terminal devices:

extract, from the time domain sequence, the one or more data blocks corresponding to the terminal device, using following Equation 3:

$$tapLocData(l_{data})=N_{SC}^{RB}-(n_{cs}(n_s,l)+m_0),$$

$$tapExtractsData(ant,l_{data})=idftOut(ant,tapLocData(l), l) \quad \text{(Equation 3); and}$$

extract, from the time domain sequence, one or more demodulation reference signal (DMRS) blocks corresponding to the terminal device, using following Equation 4:

$$tapLocDmrs(l_{dmrs})=N_{SC}^{RB}-(n_{cs}(n_s,l)+m_0),$$

$$tapExtractsDmrs(ant, l_{dmrs})=idftOut(ant, tapLocDmrs(l), l) \quad \text{(Equation 4)},$$

where
$N_{SC}^{RB}$ is a resource block size,
$n_{cs}(n_s, l)$ is a cyclic shift value,
$m_0$ is an initial cyclic shift that is unique for the terminal device,
$tapLocData(l_{data})$ is a location of a data block in a data symbol $l_{data}$ in the time domain sequence,
idftOut (ant, tapLocData(l), l) is the data block at $tapLocData(l_{data})$,
$tapExtractsData(ant, l_{data})$ is the extracted data block,
$tapLocDmrs(l_{dmrs})$ is a location of a DMRS block in a DMRS symbol $l_{dmrs}$ in the time domain sequence,
idftOut (ant, tapLocDmrs(l), l) is the DMRS block at $tapLocDmrs(l_{dmrs})$, and
$tapExtractsDmrs(ant, l_{dmrs})$ is the extracted DMRS block.

16. The storage medium of claim 15, wherein the computer program, when executed by the processor, further causes the processor to, for each terminal device among the plurality of terminal devices:

remove orthogonal cover code (OCC) from the one or more data blocks and the one or more DMRS blocks, to correspondingly obtain OCC-removed data and OCC-removed DMRS, using following Equation 5 and Equation 6:

$$deOccData(ant)=mean(tapExtractsData(ant,l_{data})* conj(w(l_{data})) \quad \text{(Equation 5)},$$

$$deOccDmrs(ant)=mean(tapExtractsDmrs(ant,l_{dmrs})* conj(w(l_{dmrs})) \quad \text{(Equation 6)},$$

where
w(data) is the OCC corresponding to the extracted data block $tapExtractsData(ant, l_{data})$,
deOccData(ant) is the OCC-removed data which is a mean of $tapExtractsData(ant, l_{data})*conj(w(l_{data}))$ across all data symbols in the time domain sequence,
$w(l_{dmrs})$ is the OCC corresponding to the extracted DMRS block $tapExtractsDmrs(ant, l_{dmrs})$, and
deOccDmrs(ant) is the OCC-removed DMRS which is a mean of $tapExtractsDmrs(ant, l_{dmrs})*conj(w(l_{dmrs}))$ across all DMRS symbols in the time domain sequence.

17. The storage medium of claim 16, wherein the computer program, when executed by the processor, further causes the processor to:

extract, from the time domain sequence, one or more noise blocks, using Equation 3 with $m_0$ being a reserved initial cyclic shift that is not used by, or allotted to, any terminal device among the plurality of terminal devices;

determine noise power, using following Equation 7:

$$instNoisePwr=mean(abs(noiseTapExtracts(ant,l))^2) \quad \text{(Equation 7)},$$

where
noiseTapExtracts(ant, l) is the noise block extracted from the time domain sequence at symbol l, and
instNoisePwr is the noise power, which is a mean of $abs(noiseTapExtracts(ant, l))^2$ across all symbols in the time domain sequence for each antenna and also across all of the plurality of antennas; and for each terminal device among the plurality of terminal devices,
determine signal power of the terminal device, using following Equation 8:

$$signalPwr=mean(abs(deOccDmrs(ant))^2) \quad \text{(Equation 8); and}$$

determine a signal-to-noise ratio (SNR) of the terminal device, using following Equation 9:

$$snr_{dB} = 10*\log_{10}\left(\frac{signalPwr}{instNoisePwr}\right), \qquad \text{(Equation 9)}$$

where
signalPwr is the signal power of the terminal device which is a mean of abs(deOccDmrs(ant))$^n$ across all of the plurality of antennas, and
$snr_{dB}$ is the SNR of the terminal device.

18. The storage medium of claim 17, wherein the computer program, when executed by the processor, further causes the processor to, for each terminal device among the plurality of terminal devices:
perform data equalization and data decoding, using following Equation 10 and Equation 11:

decDataSymb(ant)=deOccData(ant)*conj(deOccDmrs (ant))  (Equation 10), decData=mean(decDataSymb)  (Equation 11), where
decDataSymb(ant) is decoded data of the terminal device obtained from the received signal at the corresponding antenna, and
decData is the decoded data of the terminal device which is a mean of decDataSymb(ant) across all of the plurality of antennas.

19. The storage medium of claim 18, wherein the computer program, when executed by the processor, further causes the processor to, for each terminal device among the plurality of terminal devices:

in response to the SNR of the terminal device being equal to or lower than a predetermined threshold, determine that the received signals include no signal from the terminal device; and
in response to the SNR of the terminal device being higher than the predetermined threshold, send the decoded data of the terminal device to at least one higher layer in a protocol stack.

20. A method performed at least in part by a processor, the method comprising:
obtaining, using a base sequence, a demodulated signal sequence from a signal received over a physical uplink control channel (PUCCH) format 1 (FMT1);
performing an Inverse Discrete Fourier Transform (IDFT) on the demodulated signal sequence to obtain a time domain sequence;
extracting, from the time domain sequence and based on an initial cyclic shift that is unique for a terminal device, one or more data blocks and one or more demodulation reference signal (DMRS) blocks corresponding to the terminal device;
removing orthogonal cover code (OCC) from the one or more data blocks and the one or more DMRS blocks, to correspondingly obtain OCC-removed data and OCC-removed DMRS;
obtaining decoded data, based on the OCC-removed data and OCC-removed DMRS of the terminal device; and
utilizing the decoded data for handling further communications with the terminal device.

\* \* \* \* \*